United States Patent
Kuta et al.

(10) Patent No.: US 12,505,251 B2
(45) Date of Patent: Dec. 23, 2025

(54) SYSTEM AND METHOD FOR RECONSTRUCTION OF FACES FROM ANONYMIZED MEDIA USING NEURAL NETWORK BASED STEGANOGRAPHY

(71) Applicant: DE-IDENTIFICATION LTD., Tel Aviv (IL)

(72) Inventors: Eliran Kuta, Tel Aviv (IL); Sella Blondheim, Tel Aviv (IL); Gil Perry, Tel Aviv (IL); Matan Ben Yosef, Korazim (IL); Yoav Hacohen, Jerusalem (IL); Or Gorodissky, Tel Aviv (IL)

(73) Assignee: DE-IDENTIFICATION LTD., Tel Aviv (IL)

( * ) Notice: Subject to any disclaimer, the term of this patent is extended or adjusted under 35 U.S.C. 154(b) by 631 days.

(21) Appl. No.: 17/785,443

(22) PCT Filed: Dec. 15, 2020

(86) PCT No.: PCT/IL2020/051291
§ 371 (c)(1),
(2) Date: Jun. 15, 2022

(87) PCT Pub. No.: WO2021/124324
PCT Pub. Date: Jun. 24, 2021

(65) Prior Publication Data
US 2023/0027783 A1    Jan. 26, 2023

Related U.S. Application Data

(60) Provisional application No. 62/948,364, filed on Dec. 16, 2019.

(51) Int. Cl.
*G06F 21/62*    (2013.01)
*G06V 10/82*    (2022.01)
*G06V 40/16*    (2022.01)

(52) U.S. Cl.
CPC .......... *G06F 21/6254* (2013.01); *G06V 10/82* (2022.01); *G06V 40/168* (2022.01); *G06V 40/173* (2022.01)

(58) Field of Classification Search
CPC ................. G06F 21/6254; G06F 21/32; G06F 18/24323; G06V 10/82; G06V 40/168;
(Continued)

(56) References Cited

U.S. PATENT DOCUMENTS

| 6,278,791 B1 | 8/2001 | Honsinger et al. |
| 8,270,718 B2 | 9/2012 | Drory et al. |

(Continued)

FOREIGN PATENT DOCUMENTS

| EP | 3188058 | 7/2017 |
| EP | 3451209 | 3/2019 |

(Continued)

OTHER PUBLICATIONS

Cichowski et al. Reversible Video Stream Anonymization for Video Surveillance Systems Based on Pixels Relocation and Watermarking, IEEE (Year: 2011).*

(Continued)

*Primary Examiner* — John B Strege
(74) *Attorney, Agent, or Firm* — PEARL COHEN ZEDEK LATZER BARATZ LLP

(57) ABSTRACT

A system and method for concealing and revealing a human face in media objects may include obtaining a first media object capturing an image of the face; employing a first unit to: extract, from the first media object, a set of features representing the face, and generate a second media object, by embedding the extracted features in an anonymized media object; and employing a second unit to recognize the face based on the second media object.

19 Claims, 5 Drawing Sheets

(58) Field of Classification Search
CPC .... G06V 40/173; G06N 3/0455; G06N 3/088; G06N 3/094; H04L 63/0861
See application file for complete search history.

(56) References Cited

U.S. PATENT DOCUMENTS

| | | | |
|---|---|---|---|
| 9,105,119 | B2 | 8/2015 | Whitehill et al. |
| 10,630,866 | B2* | 4/2020 | Alameh ............ G06V 40/172 |
| 11,210,503 | B2* | 12/2021 | Taigman ............ G06N 3/045 |
| 2007/0236513 | A1 | 10/2007 | Hedenstroem et al. |
| 2010/0074525 | A1 | 3/2010 | Drory et al. |
| 2011/0123118 | A1 | 5/2011 | Nayar et al. |
| 2012/0177248 | A1 | 7/2012 | Shuster |
| 2012/0288166 | A1 | 11/2012 | Sun et al. |
| 2014/0328547 | A1 | 11/2014 | Whitehill et al. |
| 2015/0261995 | A1 | 9/2015 | Hudgins |
| 2015/0324633 | A1 | 11/2015 | Whitehill et al. |
| 2015/0363634 | A1* | 12/2015 | Yin ............ G06V 40/171 382/118 |
| 2017/0280158 | A1* | 9/2017 | Kapik ............ H04N 19/14 |
| 2017/0301121 | A1* | 10/2017 | Whitehill ............ G06V 40/168 |
| 2017/0302661 | A1 | 10/2017 | Conell et al. |
| 2019/0050592 | A1 | 2/2019 | Grau |
| 2019/0188562 | A1 | 6/2019 | Edwards et al. |
| 2019/0238568 | A1* | 8/2019 | Goswami ............ G06F 21/566 |
| 2019/0332850 | A1 | 10/2019 | Sharma et al. |
| 2020/0097767 | A1 | 3/2020 | Perry et al. |
| 2020/0117831 | A1* | 4/2020 | Eckhard ............ H04L 9/0643 |
| 2021/0157885 | A1* | 5/2021 | Kruczek ............ G07C 9/257 |
| 2021/0232817 | A1* | 7/2021 | Gao ............ H04W 84/12 |
| 2021/0392116 | A1* | 12/2021 | Hsu ............ H04N 21/235 |
| 2022/0222373 | A1* | 7/2022 | Villax ............ G06F 21/602 |
| 2023/0034519 | A1* | 2/2023 | Ahmed ............ H04L 9/50 |

FOREIGN PATENT DOCUMENTS

| | | |
|---|---|---|
| KR | 102123248 | 6/2020 |
| MX | 2014015326 | 6/2016 |
| WO | WO 2015/039086 | 3/2015 |
| WO | WO 2015039084 | 3/2015 |
| WO | WO 2016/107651 | 7/2016 |
| WO | WO 2018225061 | 12/2018 |
| WO | WO 2020/014487 | 1/2020 |

OTHER PUBLICATIONS

Search Report of International Patent Application No. PCT/IL2020/051291 mailed on Jan. 25, 2021.
Liang Du et al. "GARP-Face: Balancing Privacy Protection and Utility Preservation in Face De-identification" IEEE International Joint Conference on Biometrics, Clearwater, FL, 2014, pp. 1-8.
Driessen et al. "Achieving Anonymity Against Major Face Recognition Algorithms" In: De Decker B., Dittmann J., Kraetzer C., Vielhauer C. (eds) Communications and Multimedia Security. CMS 2013. Lecture Notes in Computer Science, vol. 8099. Pp. 18-33, Springer, Berlin, Heidelberg.
Jourabloo et al. "Attribute Preserved Face De-identification" 2015 International Conference on Biometrics (ICB). Phuket, 2015, pp. 278-285.
Meng et al "Face De-identification for Privacy Protection" 2014 37th International Convention on Information and Communication Technology, Electronics and Microelectronics (MIPRO), Opatija, 2014, pp. 1234-1239.
Bitouk et el. "Face Swapping: Automatically Replacing Faces in Photographs" ACM Trans. Graph. 27, 3, Aug. 2008, pp. 1-8.
Muraki et al. "Anonymizing Face Images by Using Similarity-Based Metric" 2013 International Conference on Availability, Reliability and Security, Regensburg, 2013, pp. 517-524.
Chi et al. "Facial Image De-Identification using Identity Subspace Decomposition" 2014 IEEE International Conference on Acoustics, Speech and Signal Processing (ICASSP), Florence, 2014, pp. 524-528.
Gross, Ralph, et al. "Multi-pie." Image and Vision Computing 28.5 (2010): 807-813.
Yang, Shuo, et al. "Wider face: A face detection benchmark." Proceedings of the IEEE conference on computer vision and pattern recognition. 2016.
Kingma, Diederik P., and Jimmy Lei Ba. "Adam: A Method for Stochastic Optimization." (2015). ICLR 2015.
Akhtar, Naveed, and Ajmal Mian. "Threat of adversarial attacks on deep learning in computer vision: A survey." IEEE Access 6 (2018): 14410-14430.
Carlini, Nicholas, and David Wagner. "Towards evaluating the robustness of neural networks." 2017 IEEE Symposium on Security and Privacy (SP). IEEE, 2017.
Baluja, Shumeet, and Ian Fischer. "Adversarial transformation networks: Learning to generate adversarial examples." arXiv preprint arXiv:1703.09387 (2017).
Das, Nilaksh, et al. "Keeping the bad guys out: Protecting and vaccinating deep learning with jpeg compression." arXiv preprint arXiv:1705.02900 (2017).
Le, Vuong, et al. "Interactive facial feature localization." European conference on computer vision. Springer, Berlin, Heidelberg, 2012.
Messer, Kieron, et al. "XM2VTSDB: The extended M2VTS database." Second international conference on audio and video-based biometric person authentication. vol. 964.1999.
Phillips, P. Jonathon, et al. "Overview of the face recognition grand challenge." 2005 IEEE computer society conference on computer vision and pattern recognition (CVPR'05). vol. 1. IEEE, 2005.
Dziugaite, Gintare Karolina, Zoubin Ghahramani, and Daniel M. Roy. "A study of the effect of jpg compression on adversarial images." arXiv preprint arXiv:1608.00853 (2016).
Esteva, Andre. "Dermatologist-level classification of skin cancer with deep neural networks. Enhancing the Expert." Stanford University. Slide Presentation. Jun. 8, 2017. URL: https://pdfs.semanticscholar.org/0d0e/e35c1_b05868c1bc9494a202dce4b7f414370.pdf.
Schmidhuber, Jurgen. "Deep Learning in Neural Networks: An Overview." arXiv preprint arXiv: 1404.7828 (2014).
Girshick, Ross. "Fast r-cnn." Proceedings of the IEEE international conference on computer vision. 2015.
Girshick, Ross, et al. "Rich feature hierarchies for accurate object detection and semantic segmentation." Proceedings of the IEEE conference on computer vision and pattern recognition. 2014.
Deng, Jia, et al. "Imagenet: A large-scale hierarchical image database." 2009 IEEE Conference on Computer Vision and Pattern Recognition, Miami, FL, 2009, pp. 248-255.
Moosavi-Dezfooli, Seyed-Mohsen, Alhussein Fawzi, and Pascal Frossard. "Deepfool: a simple and accurate method to fool deep neural networks." Proceedings of the IEEE Conference on Computer Vision and Pattern Recognition. 2016.
Xie, Cihang, et al. "Adversarial examples for semantic segmentation and object detection." Proceedings of the IEEE International Conference on Computer Vision. 2017.
Olah, Chris, et al. "The building blocks of interpretability." Distill 3.3 (2018): e10.
Szegedy, Christian, et al. "Intriguing properties of neural networks." arXiv preprint arXiv:1312.6199 (2013).
Papernot, Nicolas, et al. "Practical black-box attacks against machine learning." Proceedings of the 2017 ACM on Asia Conference on Computer and Communications Security. ACM, 2017.
Papernot, Nicolas, et al. "The limitations of deep learning in adversarial settings." 2016 IEEE European Symposium on Security and Privacy (EuroS&P). IEEE, 2016.
Csaji, Balazs Csanad. "Approximation with artificial neural networks." Faculty of Sciences, Etvs Lornd University, Hungary 24 (2001): 48.
Belhumeur, Peter N., et al. "Localizing parts of faces using a consensus of exemplars." IEEE transactions on pattern analysis and machine intelligence 35.12 (2013): 2930-2940.
Ramanan, Deva, and Xiangxin Zhu. "Face detection, pose estimation, and landmark localization in the wild." 2012 IEEE conference on computer vision and pattern recognition. IEEE, 2012.

(56) References Cited

OTHER PUBLICATIONS

Simonyan, Karen, and Andrew Zisserman. "Very deep convolutional networks for large-scale image recognition." arXiv preprint arXiv:1409.1556 (2014).
Goodfellow, Ian J., Jonathon Shlens, and Christian Szegedy. "Explaining and harnessing adversarial examples." arXiv preprint arXiv:1412.6572 (2014).
Perez et al. "Face recognition and De-Identification in the frequency domain", Dec. 31, 2016.
Sendik "What's in a face? Metric learning for face characterization", Computer Graphics Forum, 2019.
He et al. "AttGAN: Facial Attribute Editing By Only Changing What You Want" Jul. 25, 2018.
Chi Hehua et al. "Face de identification using facial identity preserving features" Dec. 14, 2015.
International Search Report for App. No. PCT/IL2020/050907 dated Nov. 30. 2020.
International Search Report for App. No. PCT/IL2019/050993 dated Dec. 31, 2019.
European Search Report for App. No. 18813726.9 dated Feb. 8, 2021.
Newton EM, Sweeney L, Malin B. Preserving privacy by de-identifying facial images. IEEE transactions on Knowledge and Data Engineering. Jan. 10, 2005;17(2):232-43. Newton et al., Jan. 10, 2005.
European Search Report for Application No. EP20202094.7 Mailed on Mar. 22, 2021.
Search Report for Application No. PCT/IL2020/051287 mailed on Mar. 25, 2021.
Search Report for Application No. PCT/IL2020/051291 mailed on Jan. 25, 2021.
Ren, Zhongzheng; Lee, Yong Jae; Ryoo. Learning to Anonymize Faces for Privacy Preserving Action Detection. Eprint arXiv:1803.11556, Jul. 26, 2018.
Letournel, Geoffrey; Bugeau, Aurelie; TA, Vinh-Thong; Domenger, Jean-Philippe. Face De-identification with Expressions Preservations. International Conference on Image Processing (ICIP) 2015, Sep. 2015.
International Search Report of Application No. PCT/IL2018/050607 mailed on Aug. 21, 2018.
PCT Search Report for Application No. PCT/IL2020/051286, mailed on Mar. 18, 2021.
Justus Thies et al. "Face2Face: Real-time Face Capture and Reenactment of RGB Videos" CVPR2016, Jul. 29, 2020.
Naruniec et al. "High-Resolution Neural Face Swapping for Visual Effects" vol. 39 No. 4 (2020).
Hyeongwoo Kim et al. "Deep Video Portraits" ACM Transactions on Graphics (TOG) vol. 37, No. 4, May 29, 2018.
Thies et al. "Deferred Neural Rendering: Image Synthesis using Neural Textur" Apr. 28, 2019.
Thies et al. "Neural Voice Puppetry: Audio-driven Facial Reenactment" arXiv preprint arXiv:1912.05566 Dec. 11, 2019.
Fried et al. "Text-based editing of talking-head video" ACM Transactions on Graphics vol. 38 Issue 4 Article No. 68, pp. 1-14, Jul. 4, 2019.
Brkic et al., "I Know That Person: Generative Full Body and Face De-Identification of People in Images", 2017.
Yuezen Li et al; De-Identification without Losing Faces; Arxiv Org, Cornell University Library, 201 Olin Library Cornell University Ithaca NY 14853, Feb. 12, 2019, XP081027993.
Blavz Meden et al; Face Deidentification with Generative Deep Neural Networks; Arxiv Org, Cornell University Library, 201 Olin Library Cornell University Ithaca NY 14853, Jul. 28, 2017, XP080959801.
Muraki, Tomonari et al; "Controlling Tradeoff between Security and Usability in Anonymizing Face Images", Security Management, Jan. 25, 2015, vol. 28, No. 3 pp. 3-16.
Search Report of European Application No. 20854071.6 mailed on Aug. 14, 2023.
Search Report of European Application No. 20901304.4 mailed on Dec. 4, 2023.
Office Action for U.S. Appl. No. 16/619,106, mailed on Oct. 22, 2021.

* cited by examiner

SYSTEM AND METHOD FOR RECONSTRUCTION OF FACES FROM ANONYMIZED MEDIA USING NEURAL NETWORK BASED STEGANOGRAPHY

CROSS-REFERENCE TO RELATED APPLICATIONS

This application is a National Phase Application of PCT International Application No. PCT/IL2020/051291, International Filing Date Dec. 15, 2020, published as WO 2021/124324 and entitled System and Method for Reconstruction of Faces from Anonymized Media Using Neural Network Based Steganography claiming the benefit of U.S. Provisional Patent Application No. 62/948,364, filed Dec. 16, 2019, which is hereby incorporated by reference.

FIELD OF THE INVENTION

The present invention relates to face anonymization. More particularly, the present invention relates to systems and methods for anonymizing faces in images and for reconstruction of faces from anonymized media using neural network based steganography.

BACKGROUND OF THE INVENTION

Recent improvements in commercial facial recognition systems has brought these systems to achieve an unprecedented level of accuracy in many face recognition tasks. As these systems became abundant and widely used, major concerns have been raised regarding the privacy threats these systems may impose. As such, different vendors have begun offering systems that can automatically replace faces of people who appear in different media, such as photos and videos, with anonymized versions of them, and thus preventing the ability to recognize these people by third-parties who may later consume this media. However, such practice can limit certain companies who wish to comply with recent privacy regulations, but who still wish to preserve the ability to identify the individuals that originally appeared in the media (before it has undergone any anonymization procedure).

SUMMARY OF THE INVENTION

In some embodiments method of concealing and revealing a human face in media objects may include obtaining a first media object capturing an image of the face; employing a first unit to: extract, from the first media object, a set of features representing the face, and generate a second media object, by embedding the extracted features in an anonymized media object, wherein perceptual differences between the second media object and the anonymized media object are minimized by the first unit; and employing a second unit to recognize the face based on the second media object.

Some embodiments may employ the second unit to: extract, from the second media object, a at least some of the embedded features, and generate a reconstructed media object by reconstruct the image of the face based on the extracted features. Reconstructing the image of the face may be such that the face is recognizable by a human. Reconstructing the image of the face may be such that the face is recognizable by a computerized face recognition unit.

At least one of the first and second units may include a model generated by adversarial training of a neural network using a discriminator adapted to classify a media object as: either the first media object or the second media object, or either the second media object or the reconstructed media object. Embedding the extracted features in the anonymized media object may include at least one of: modifying, according to the extracted features, a predefined set of pixels in the anonymized media object; and modifying, according to the extracted features, a set of pixels in the anonymized media object, wherein the set of pixels may be selected based on a function of at least one of: a scene, a location, an intensity, a color and a frequency calculated based on a set of pixels.

The first and second units may include respective first and second models generated by training respective first and second neural networks. The first and second neural networks may be trained simultaneously. At least one of the first and second neural networks may be trained using a training set of pairs of a media object capturing an image of a face and corresponding anonymized media object, wherein in each of the anonymized media objects, the face from the corresponding media object may be replaced by an anonymized face.

The first media object may capture a set of faces and, for each of at least some of the faces in the set, an embodiment may extract, from the first media object, a set of features, and embed the extracted features in an anonymized media object; and extract from the second media object, a at least some of the embedded features, and reconstruct images of at least some of the faces in the set based on the extracted features. The first media object may be one of: an image and a multimedia object. Other aspects and/or advantages of the present invention are described herein.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
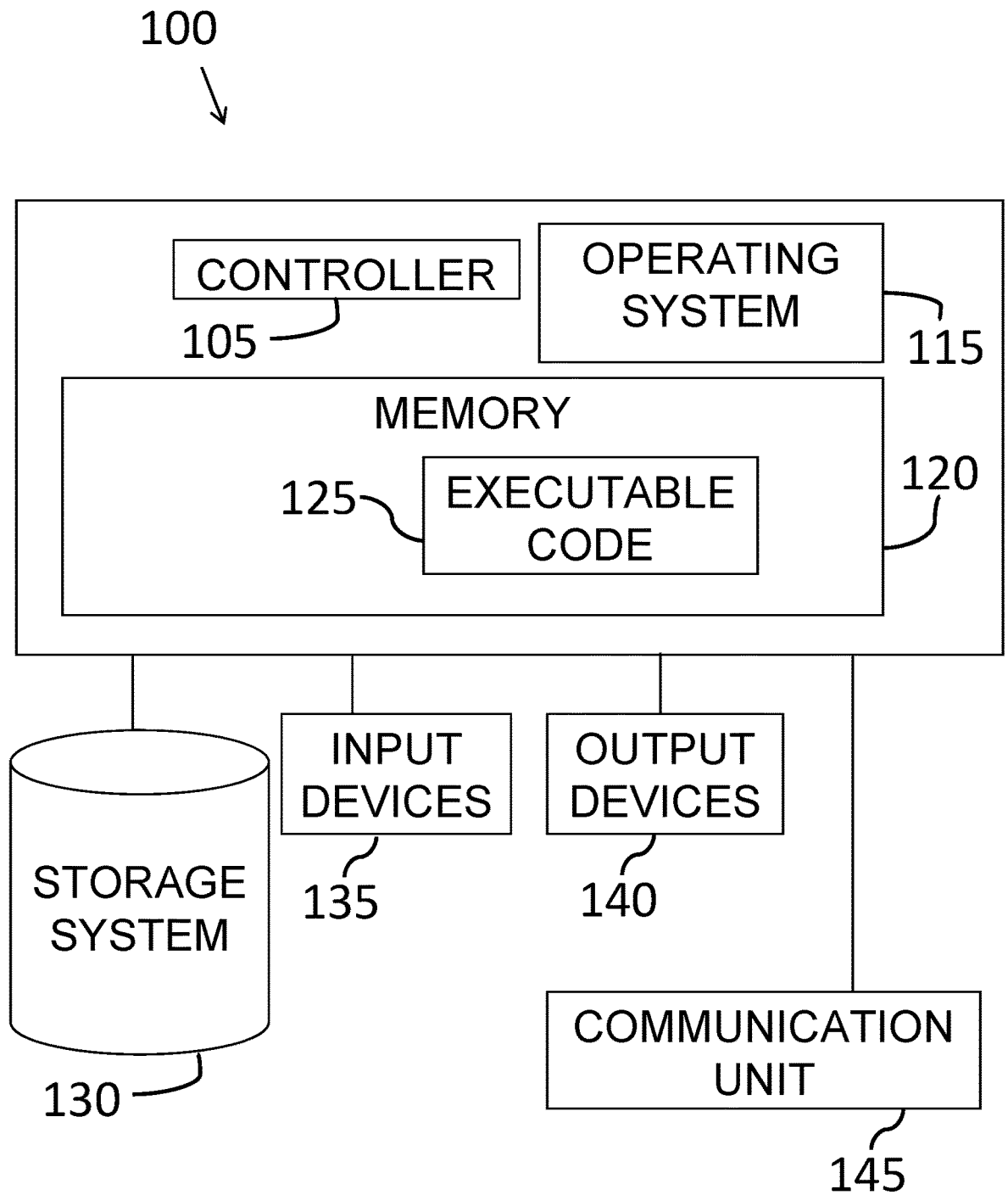
FIG. 1 shows a block diagram of an exemplary computing device, according to some embodiments of the invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Reference is made to FIG. 1, which is a schematic block diagram of an example computing device, according to some embodiments of the invention. Computing device 100 may include a controller or processor 105 (e.g., a central processing unit processor (CPU), a chip or any suitable computing or computational device), an operating system 115, memory 120, executable code 125, storage 130, input devices 135 (e.g. a keyboard or touchscreen), and output devices 140 (e.g., a display), a communication unit 145 (e.g., a cellular transmitter or modem, a Wi-Fi communication unit, or the like) for communicating with remote devices via a communication network, such as, for example, the Internet. Controller 105 may be configured to execute program code to perform operations described herein. The system described herein may include one or more computing device 100, for example, to act as the various devices or the components shown in FIG. 2. For example, system 200 may be, or may include computing device 100 or components thereof.

Operating system 115 may be or may include any code segment (e.g., one similar to executable code 125 described herein) designed and/or configured to perform tasks involving coordinating, scheduling, arbitrating, supervising, controlling or otherwise managing operation of computing device 100, for example, scheduling execution of software programs or enabling software programs or other modules or units to communicate.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of possibly different memory units. Memory 120 may be a computer or processor non-transitory readable medium, or a computer non-transitory storage medium, e.g., a RAM.

Executable code 125 may be any executable code, e.g., an application, a program, a process, task or script. Executable code 125 may be executed by controller 105 possibly under control of operating system 115. For example, executable code 125 may be a software application that performs methods as further described herein. Although, for the sake of clarity, a single item of executable code 125 is shown in FIG. 1, a system according to some embodiments of the invention may include a plurality of executable code segments similar to executable code 125 that may be stored into memory 120 and cause controller 105 to carry out methods described herein.

Storage 130 may be or may include, for example, a hard disk drive, a universal serial bus (USB) device or other suitable removable and/or fixed storage unit. In some embodiments, some of the components shown in FIG. 1 may be omitted. For example, memory 120 may be a non-volatile memory having the storage capacity of storage 130. Accordingly, although shown as a separate component, storage 130 may be embedded or included in memory 120.

Input devices 135 may be or may include a keyboard, a touch screen or pad, one or more sensors or any other or additional suitable input device. Any suitable number of input devices 135 may be operatively connected to computing device 100. Output devices 140 may include one or more displays or monitors and/or any other suitable output devices. Any suitable number of output devices 140 may be operatively connected to computing device 100. Any applicable input/output (I/O) devices may be connected to computing device 100 as shown by blocks 135 and 140. For example, a wired or wireless network interface card (NIC), a universal serial bus (USB) device or external hard drive may be included in input devices 135 and/or output devices 140.

Some embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, an article may include a storage medium such as memory 120, computer-executable instructions such as executable code 125 and a controller such as controller 105. Such a non-transitory computer readable medium may be, for example, a memory, a disk drive, or a USB flash memory, encoding, including or storing instructions, e.g., computer-executable instructions, which, when executed by a processor or controller, carry out methods disclosed herein. The storage medium may include, but is not limited to, any type of disk including, semiconductor devices such as read-only memories (ROMs) and/or random-access memories (RAMs), flash memories, electrically erasable programmable read-only memories (EEPROMs) or any type of media suitable for storing electronic instructions, including programmable storage devices. For example, in some embodiments, memory 120 is a non-transitory machine-readable medium.

A system according to some embodiments of the invention may include components such as, but not limited to, a plurality of central processing units (CPU) or any other suitable multi-purpose or specific processors or controllers (e.g., controllers similar to controller 105), a plurality of input units, a plurality of output units, a plurality of memory units, and a plurality of storage units. A system may additionally include other suitable hardware components and/or software components. In some embodiments, a system may include or may be, for example, a personal computer, a desktop computer, a laptop computer, a workstation, a server computer, a network device, or any other suitable computing device. For example, a system as described herein may include one or more facility computing device 100 and one or more remote server computers in active communication with one or more facility computing device 100 such as computing device 100, and in active communication with one or more portable or mobile devices such as smartphones, tablets and the like.

Figure 2:
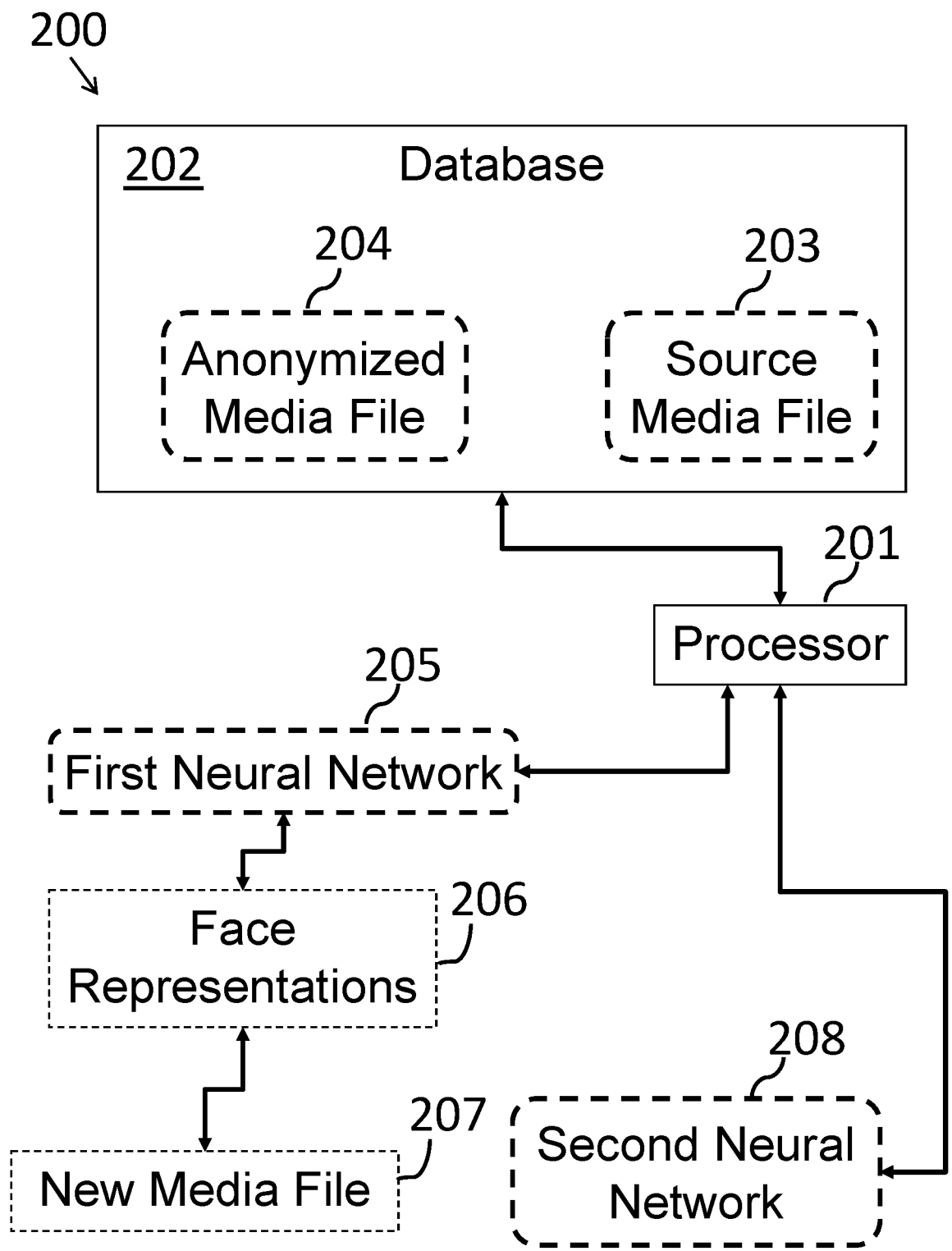
FIG. 2 shows a block diagram of a system for face reconstruction from anonymized media, according to some embodiments of the invention.

Reference is now made to FIG. 2, which shows a block diagram of a system 200 for face reconstruction from anonymized media, according to some embodiments. In FIG. 2, hardware elements are indicated with a solid line and the direction of arrows may indicate the direction of information flow.

The system 200 may include at least one processor 201 (e.g., such as controller 105 shown in FIG. 1), configured to apply at least one neural network for face reconstruction. In some embodiments, the at least one processor 201 may employ Steganography, by hiding secret messages (or images) within ordinary public messages. Thus, Steganography may be used to hide a face of a subject in anonymized media.

In some embodiments, original (non-anonymized) facial data may be compressed and/or embedded into anonymized media, while keeping the differences between newly generated media and the input anonymized media, visually not perceptible (e.g., by a human observer). In some embodiments, the at least one processor 201 may employ Steganography to reconstruct the original faces from the re-generated anonymized media, even if this media travels through compression mechanisms after-which the reconstructed media may slightly differ from the uncompressed original media, as further described hereinafter.

According to some embodiments, the at least one processor 201 may be coupled to a database 202 comprising pairs of source media files 203 and corresponding anonymized media files 204. Given a source media file 203 (e.g., a video) and an anonymized media file 204 (e.g., a video), a modified version of the anonymized media file 204 may be generated by a dedicated neural network to closely resembles the original anonymized media file 204, but from which the original faces from the source media file 203 may be reconstructed.

The processor 201 may be configured to apply a first neural network 205 for training a machine learning algorithm on data received from the database 202. In some embodiments, the first neural network 205 may extract face representations 206 from the received one or more source media files 203. The first neural network 205 may accordingly generate a new media file 207 based on the received one or more anonymized media files 204, where the new media file 207 may be generated for face reconstruction of a face of the received one or more source media file 203.

In some embodiments, at the end of the training process, the first neural network 205 may embed the extracted face representations 206 into the new media file 207, where perceptual differences between the new media file 207 and the received anonymized media file 204 may be minimized by the first neural network 205 (e.g., with a loss function).

After training, the at least one processor 201 may apply a second neural network 208 configured to extract the face representations 206 embedded into the new media file 207, and reconstruct at least one face image from the extracted face representations 206. In some embodiments, the reconstructed at least one face image may be reconstructed to be recognized by a human observer.

Figure 3:
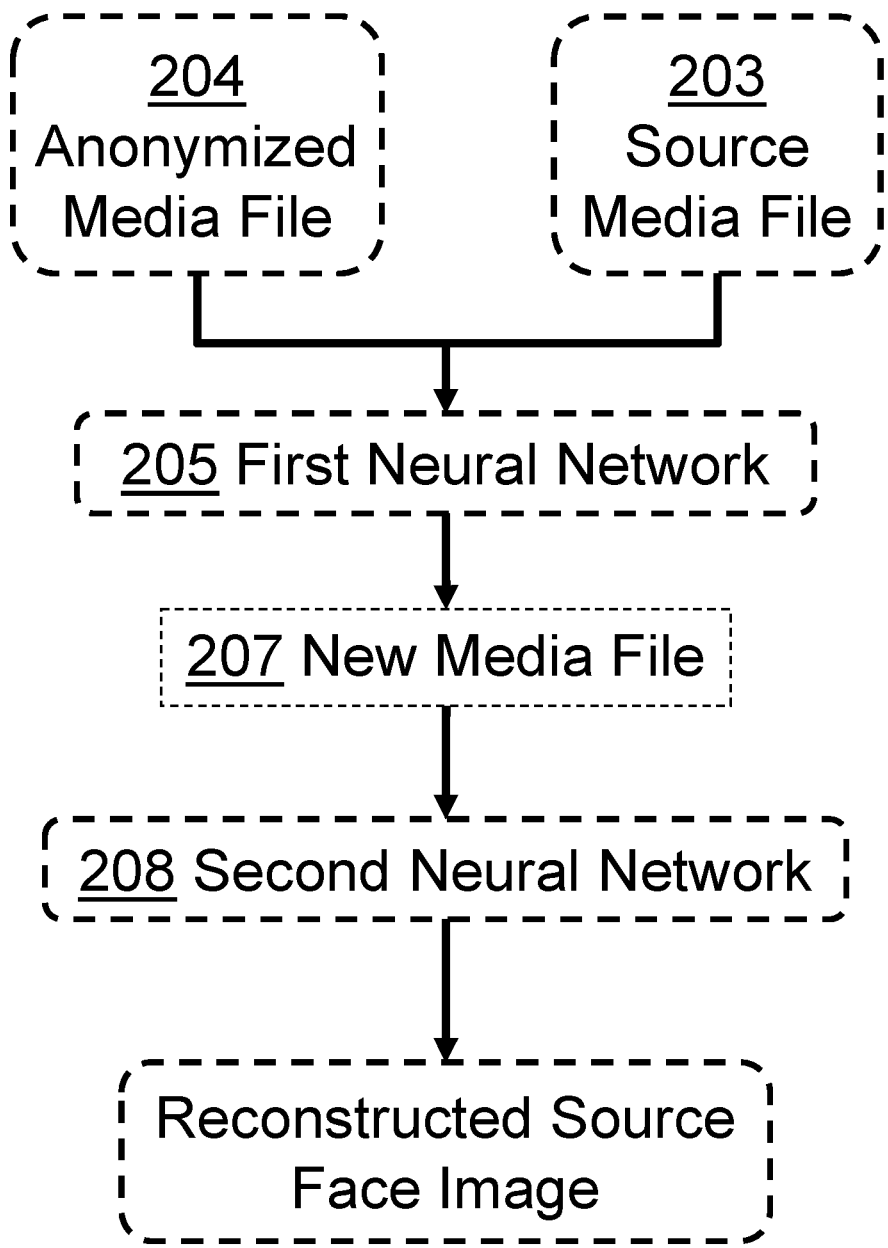
FIG. 3 schematically illustrates a flowchart of information flow in the system shown in FIG. 2, according to some embodiments of the invention.

Reference is now made to FIG. 3, which schematically illustrates a flowchart of information flow in the system 200 shown in FIG. 2, according to some embodiments. The data from the pairs of source media files 203 and corresponding anonymized media files 204 may be fed to the first neural network 205 for training to generate a (modified) new media file 207. After training, the new media file may be accordingly fed to the second neural network 208 in order to reconstruct the source face image.

Referring back to FIG. 2. The training may include jointly training the first neural network 205 and the second neural network 208 on a collection of source media 203 and anonymized media 204 pairs. Specifically, a set of K source videos $V=\{v^{(k)}\}_{k\in[K]}$, and a corresponding set of anonymized videos $V_A=\{V_A^{(k)}\}_{RE\ [K]}$ may be used, where $v_A^{(k)}$ is a modified version of the source video $v^{(k)}$, in which all faces have been replaced by an anonymized version by some external anonymization method. Given a frame x from a source video $v \in V$, and frame $x_A$ from an anonymized video $v_A \in V_A$, the first neural network 205 may be trained to generate a new frame $\widehat{x_A}=E(x,x_A)$ which is perceptually similar to the anonymized version $x_A$, but includes dense representations of the original faces. While the second neural network 208 may be trained to reconstruct the original faces from the new frame $\widehat{x_A}$ generated by the first neural network 205. The two neural networks may be trained using the Adam optimizer on the following loss function formulas:

$$L_{sim}(x_A,\widehat{x_A})=\|x_A-\widehat{x_A}\|_1 \qquad \text{Formula 1}$$

$$L_{recon}(x,\widehat{x_A})=\Sigma_{f\in F(x)}\|f-\hat{f}\|_1 \qquad \text{Formula 2}$$

where F (x) is the set of all faces found in the video frame x, and $\hat{f}$ is the reconstruction of a source face $f\in F(x)$, as obtained from the second neural network 208.

It will be understood that the Adam optimizer described herein is just one example and that any other methods or techniques, e.g., stochastic gradients may be used. It will also be understood that, for the sake of clarity and simplicity, only one face in an image is described, however, the method described herein may be applied to images with any number of faces, that is, any number of faces in an image may be concealed and then revealed as described with respect to a single face in an image.

In order to increase the fidelity of the frames generated by the first neural network 205, adversarial training may be employed and another neural network 'D' may be used that may be trained to discriminate between original video frames belonging to the anonymized videos, and those video frames generated by the first neural network 205. In some embodiments, the first neural network 205 may be trained to fool the new neural network 'D' by generating more convincing video frames. This adversarial loss may be written as:

$$L_D(x_A,\widehat{x_A})=\log(D(\widehat{x_A}))-\log(D(x_A)) \qquad \text{Formula 3}$$

$$L_G(\widehat{x_A})=-\log(D(\widehat{x_A})) \qquad \text{Formula 4}$$

$$L_{adv}(x_A,\widehat{x_A})=L_D(x_A,\widehat{x_A})+L_G(\widehat{x_A}) \qquad \text{Formula 5}$$

The final loss term may accordingly become:

$$L(V,V_A)=\Sigma_{k\in[K]}\Sigma_{x\in v^{(k)}}L_{sim}(x_A,\widehat{x_A})+\lambda^*L_{recon}(x_A,\widehat{x_A})+L_{adv}(x_A,\widehat{x_A})$$ Formula 6 where λ is a tuneable hyper-parameter that controls the balance between the two loss terms.

Figure 4:
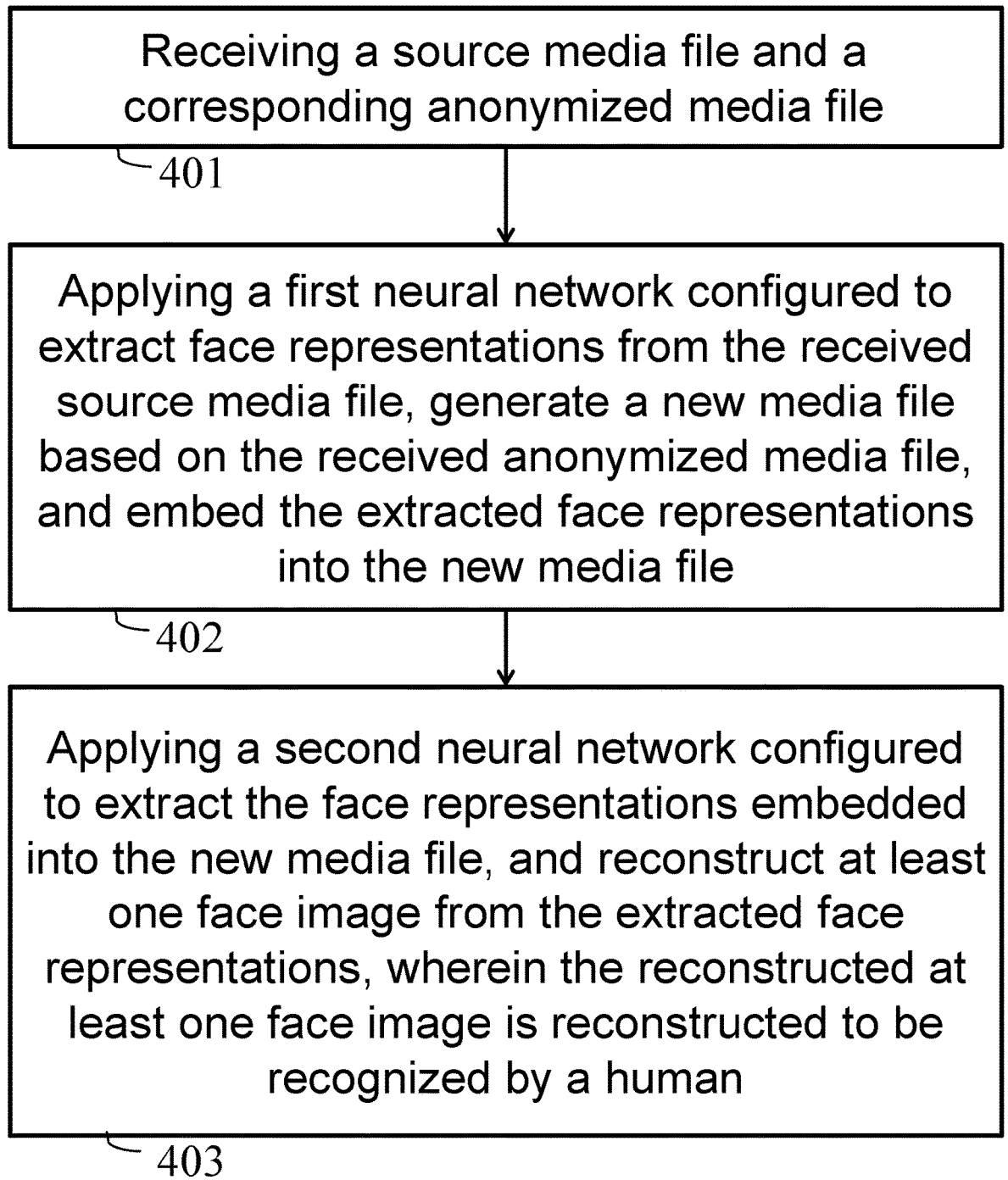
FIG. 4 shows a flowchart of method of face reconstruction from anonymized media, according to some embodiments of the invention.

Reference is now made to FIG. 4, which shows a flowchart of method of face reconstruction from anonymized media, according to some embodiments. In Step 401, a source media file and a corresponding anonymized media file may be received.

In Step 402, a first neural network may be applied, the first neural network may be configured to extract face representations from the received source media file, generate a new media file based on the received anonymized media file, and embed the extracted face representations into the new media file.

In some embodiments, the new media file may be generated for face reconstruction of a face of the received source media file. In some embodiments, perceptual differences between the new media file and the received anonymized media file may be minimized by the first neural network.

In Step 403, a second neural network may be applied, the second neural network may be configured to apply a second neural network configured to extract the face representations embedded into the new media file, and reconstruct at least one face image from the extracted face representations, wherein the reconstructed at least one face image is reconstructed to be recognized by a human observer.

In some embodiments, a method of face reconstruction from anonymized media may include the steps of receiving a source media file and a corresponding anonymized media file; applying a first neural network configured to: extract face representations from the received source media file; generate a new media file based on the received anonymized media file, wherein the new media file is generated for face reconstruction of a face of the received source media file; embed the extracted face representations into the new media file, wherein perceptual differences between the new media file and the received anonymized media file are minimized by the first neural network; and applying a second neural network configured to: extract the face representations embedded into the new media file; and reconstruct at least one face image from the extracted face representations, wherein the reconstructed at least one face image is reconstructed to be recognized by a human.

In some embodiments, at least one of the first neural network and the second neural network are trained with a machine learning algorithm using a training set of media file pairs of source media and corresponding anonymized media, and wherein in each anonymized media file, the face from the corresponding source media file is replaced by an anonymized face.

In order to train the at least one of the first and second neural networks, some embodiments may apply adversarial training with a third neural network trained to discriminate between media frames of the anonymized media and media frames generated by the first neural network. A third or fourth neural network may be trained to discriminate between images reconstructed by the second network and original images.

In some embodiments, a system for face reconstruction from anonymized media may include at least one processor, configured to apply at least one neural network for face reconstruction; and a database, coupled to the processor, and comprising pairs of source media files and corresponding anonymized media files; wherein the processor is configured to: apply a first neural network configured to: extract face representations from the received source media file; generate a new media file based on the received anonymized media file, wherein the new media file is generated for face reconstruction of a face of the received source media file; and embed the extracted face representations into the new media file, wherein perceptual differences between the new media file and the received anonymized media file are minimized by the first neural network; and apply a second neural network configured to: extract the face representations embedded into the new media file; and reconstruct at least one face image from the extracted face representations, wherein the reconstructed at least one face image is reconstructed to be recognized by a human.

In some embodiments, at least one of the first neural network and the second neural network in the system are trained with a machine learning algorithm using a training set from the database, and wherein in each anonymized media file the face from the corresponding source media file is replaced by an anonymized face.

In some embodiments, the processor is further configured to apply adversarial training with a third neural network trained to discriminate between media frames of the anonymized media and media frames generated by the first neural network.

As described, available (e.g., commercial) facial recognition systems are able to identify or recognize faces in images or videos with high accuracy. Accordingly, storing or otherwise keeping images or videos of people reflects on their privacy since stored images can be stolen or otherwise obtained by a third party (e.g., an entity other than the owner of an image and/or other than a person appearing in the image). Merely replacing, anonymizing or obscuring faces in stored images (as done by some known systems and methods) cannot adequately solve the challenge of safely keeping images of people since the actual (original) faces cannot reconstructed from the stored images.

There is therefore a need in the art for a system and method that can anonymize an image, photo or video and, in addition, provide the ability to see, recognize or identify an individual (or face) that originally appeared in the image, photo or video (before it has undergone an anonymization procedure).

As described herein, some embodiments extract (and possibly compress) original, non-anonymized, facial data and embed the extracted data into an input anonymized media to thus create a new anonymized media, while keeping the differences between the newly generated media (the new anonymized media) and the input anonymized media, visually imperceptible. As further described, some embodiments may restore an original, non-anonymized media, given the new anonymized media. Some embodiments may reconstruct an original face from an anonymized media, even if the anonymized media traveled through, or was subject to manipulations such as compression.

Accordingly, some embodiments of the invention may enable an owner of images of sensitive material (e.g., an individual, organization or any other entity who owns images of faces of employees or private individuals) to store and/or keep the sensitive images such that if the images are obtained by a third party, the third party cannot see or identify the sensitive material, e.g., even if a third party obtains images produced as described herein, the third party cannot (or is highly unlikely to) see and/or identify the individuals' or faces captured by the images.

In addition to concealing an identity of a person in an image, e.g., by producing an anonymized image as described, some embodiments of the invention enable producing (or reproducing) an image of the person (or other entity or object) from an anonymized image.

Accordingly, embodiments of the invention enable an owner of images to safely store or keep images of individuals without worrying about the privacy of the individuals. For example, using embodiments of the invention, rather than storing in its database images of its employees, an organization can store in its database anonymized images as described. If or when the need to actually see the face of an employee in an anonymized image, the organization can use an embodiment of the invention that produces (or reproduces) an image of an individual (or of any other object in an anonymized image) from an anonymized image as described herein. Where applicable, the terms "digital media" and/or simply "media" as used herein may relate to a digital object that captures a face of a person and/or a scene, for example, a media may be a digital image or photo and/or a video clip.

Some embodiments of the invention receive as input, or operate on, pairs of source and anonymized objects or media, e.g., a pair of images or videos. For example, a face of a person may appear in, or by captured by, a source media. Given a source media and an anonymized media, some embodiments modify the input anonymized media to thus generate a modified anonymized media closely resembles the input, original anonymized media, but from which a face appearing in, or captured by, an input, source media can be reconstructed.

Some embodiments may include, train and use artificial neural networks (NN). For example, as described, in some embodiments, a first NN (referred to herein as "embedder") may be trained to extract face representations of faces from an input, original media, and create a modified anonymized media by embedding the extracted data into an anonymized media. The first NN may be trained to keep perceptual differences between an input anonymized media and a modified anonymized media to a minimum. Perceptual differences as referred to herein may be, or may include any difference that can be perceived, e.g., by a human or a computerized face recognition unit.

In some embodiments, a second NN (referred to herein as "reconstructor") may be trained to extract data in a modified anonymized media (e.g., one created by the embedder NN) and use extracted data to reconstruct a viewable, recognizable or identifiable image of a face. It is noted that embodiments of the invention may use, support and/or operate with any anonymization techniques, systems or methods. In other words, embodiments of the invention may be combined with, or may include any face anonymization system or method. Accordingly, the scope of the invention is not limited by the technique, system and/or method used for anonymizing media.

Figure 5:
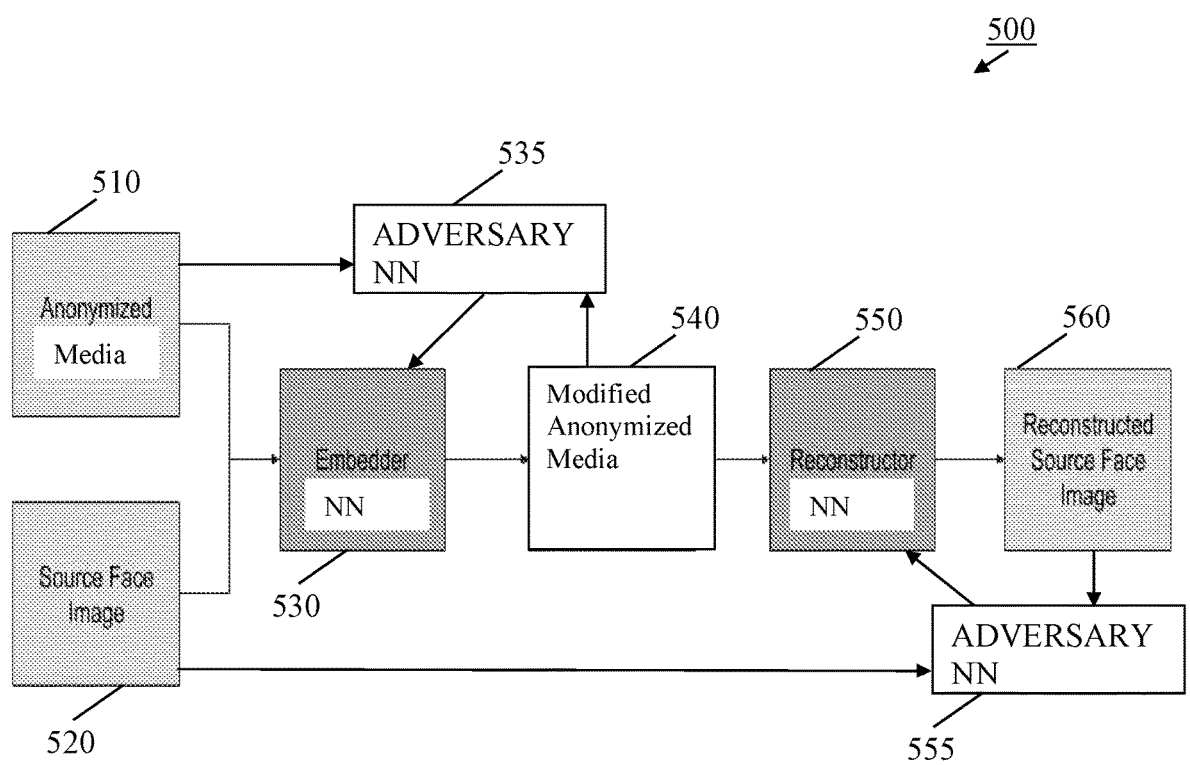
FIG. 5 shows a block diagram of a system according to illustrative embodiments of the invention.

Reference is made to FIG. 5 which shows a block diagram of a system 500 according to illustrative embodiments of the invention. System 500 may include one or more instances of computing device 100. For example, in some embodiments, NNs 530, 535, 550 and 555 may each be, or may each include a computing device 100, in other embodiments, one or more computing devices 100 may be used to implement or realize NNs 530, 535, 550 and 555. As shown, system 500 may include, use and/or or train, four NN units 530, 535, 550 and 555. As shown, an anonymized media 510 and a source face image 520 may be provided as input to NN 530. For the sake of clarity and simplicity, anonymized media 510 may be referred to herein as media 510 and source face image 520 may be referred to herein as image 520. Generally, an anonymized media 510 may be any image which does not include any, or enough, information enabling determining an identity of a person. Conceptually, an anonymized media 510 may not include an image of a person, e.g., it may be a randomly or artificially generated image (e.g., by a computer that generates an image by randomly setting pixel values), or an anonymized media 510 may be an image of a nature scene or it may be an image of a person that was processed or modified such that the identity of the person cannot be determined.

For the sake of simplicity and clarity, a single image (520), single anonymized media (510), single modified anonymized media (540) and single reconstructed face image (560) are shown in FIG. 5 and mainly described herein. It will however be understood that embodiments of the invention may process videos or sequences of images or multimedia content as described herein for a single image 520. For example, an embodiment may iteratively process frames in a video or other multimedia content as described herein with respect to image 520, that is, frames in an input video may each be treated and processed by embodiments of the invention as described with reference to image 520, either using the same media 510 for all frames or selecting a different media 510 for different frames. It is noted that media objects 510, 520, 540 and 560 may be, or may include, images or frames of a video. Some embodiments may create a media 540 for each frame in a video, element of a multimedia content object image in a sequence of images, and may further reconstruct each frame or image by creating, for each frame or image, an image 560 as further described herein.

For example, anonymized media 510 may be created by anonymizing source face image 520. As described, any method of anonymizing, blurring or obscuring a face seen or included in, or captured by, source face image 520 may be used in order to create anonymized media 510. In some embodiments, a model may be trained based on, or using, anonymized images created using a specific method, e.g., blurring, pixelization, face swapping and the like. In some embodiments anonymized media 510 may be created without any reference or respect to source face image 520, e.g., anonymized media 510 may be a template anonymized media created from scratch or based on a randomly selected image of a face.

As shown, based on source face image 520 and anonymized media 510, the embedder NN 530 may create modified anonymized media 540 (also referred to herein as media 540). For example, to create modified anonymized media 540, NN 530 may extract face representations from source face image 520 and modify anonymized media 510 by embedding or including in anonymized media 510 the face representations extracted from source face image 520. Face representations as referred to herein may be any information (e.g., pixel values, colors and the like) that may be extracted from an image and/or may be calculated, determined or derived based on an image.

Embedder NN 530 may be trained to create modified anonymized media 540 such that a visual or other difference between modified anonymized media 540 and anonymized media 510 is kept to a minimum. Otherwise described, the goal of NN 530 is to create a modified anonymized media 540 which is indistinguishable from anonymized media 510, either by man or by machine.

In some embodiments, NN 535 may act or function as a discriminator or classifier. For example, NN 535 may be trained to identify or classify anonymized media objects 510 as such, and to further identify or classify modified media objects 540 as such. Accordingly, given an input media object, NN 535 may classify the input media as either belonging to a class of anonymized media objects (the class of media object 510) or belonging to a class of modified media objects (the class of modified media object 540). In this context, media objects 510 and 540 are referred to in the art as real and fake objects respectively, that is, an original, input (media 510 in this case) is considered, or referred to in the art, as the "real" thing while a modified original object (media 540 in this case) is considered, or referred to as "fake"

Staying with this (real/fake) terminology, NN 535 may be trained to classify a media object as either real or fake. In some embodiments, NN 535 and NN 530 may be trained together, simultaneously or in an interleaved fashion or manner. For example, after NN 530 creates a modified media object 540 the object is provided as input to NN 535 and output from NN 535 may be provided back to NN 530 informing NN 530 whether NN 535 classified the modified media object 540 as anonymized media 510 or modified media object 540 (real or fake).

Accordingly, a loop may be formed where as NN 535 gets better in classifying media objects it drives NN 530 to generate modified media objects 540 that are closer and closer in similarity to input media objects 510. For example, in simultaneous training, in each iteration of a training, a modified media object 540 created by NN 530 is provided to NN 535 for classification and NN 535 informs NN 530 how well it did, that is, NN 530 did well if NN 535 classified the (fake) modified media object 540 as (real) anonymized media object 510 and NN 530 did poorly or insufficiently well if NN 535 classified the (fake) modified media object 540 as fake. Training NNs 530 and 535 together may be interleaved or carried out in an alternative manner. For example, NN 530 may be trained over a set of images or iterations and then, e.g., after 100 iterations, a media object 540 may be provided to NN 535 for classification as described. In other embodiments, a set of modified media objects 540 previously created by NN 530 may be provided to NN 535 and used for training NN 535, in yet other embodiments, success or failure indications may be provided to NN 530, from NN 535, based on an average or ration of a plurality of modified media objects 540 classified as fake or real as described.

In some embodiments, adversarial training may be used to train NN 530. For example, adversary NN 535 may be trained to discriminate between modified anonymized media 540 and anonymized media 510. An adversary NN as referred to herein may be an NN that challenges another NN. For example, while NN 530 attempts (is trained to) produce a media 540 that is as close to a media 510, adversary NN 535 challenges NN 530 by trying to identify or determine that the output media 540 of NN 530 is not similar to media 510. Training an NN using an adversary NN is referred to in the are and herein as adversarial training.

For example and as illustrated by the arrows connecting anonymized media 510 and modified anonymized media 540 with NN 535, NN 535 may be provided with anonymized media 510 and modified anonymized media 540 and may be trained to determine whether or not they are different or same. Accordingly, NN 535 may challenge NN 530, that is, NN 530's goal is to fool NN 535 into determining ("thinking") that anonymized media 510 and modified anonymized media 540 are the same media (since NN 535 could not find any (or enough) differences between the two media objects). As illustrated, NN 530 may receive input from NN 535, e.g., NN 530 may "know" whether or not it managed to fool NN 535 into thinking that anonymized media 510 and modified anonymized media 540 are the same.

Accordingly, in a training according to embodiments of the invention, adversary NN 535 keeps learning to identify differences between anonymized media 510 and modified anonymized media 540 while NN 530 keeps learning how to better create modified anonymized media 540 such that NN 535 will fail in identifying differences between anonymized media 510 and modified anonymized media 540, this loop or race can be kept running until NN 530 creates modified anonymized media 540 that is up to a requirement. For example, training of NN's 530 and 535 may be conducted until some third party unit is unable to distinguish between anonymized media 510 and modified anonymized media 540.

In some embodiments, NN 555 may act or function as a discriminator or classifier. For example, NN 555 may be trained to identify reconstructed face images 560 and further identify source face images 520 and thus, given an input media object, NN 555 may classify the input media as either belonging to a class of reconstructed face images (the class of reconstructed face image 560) or belonging to a class of source face images (the class of source face images 520). In this context, media objects or images 520 and 560 are referred to in the art as real and fake objects respectively, staying with this terminology, NN 555 may be trained to classify a media object as real or fake. In some embodiments, NN 555 and NN 550 may be trained together, simultaneously or in an interleaved fashion. For example, after NN 550 creates a reconstructed face image 560 the image is provided as input to NN 555 and output from NN 555 may be provided back to NN 550 informing NN 550 whether NN 555 classified the reconstructed face image 560 as reconstructed face image 560 or as a source face image 520 (fake or real).

Accordingly, a loop is formed where as NN 555 gets better in classifying media objects it drives NN 550 to generate reconstructed face images 560 that are closer and closer in similarity to source face images 520. For example, in simultaneous training, in each iteration of a training, a reconstructed face images 560 created by NN 550 is provided to NN 555 for classification and NN 555 informs NN 550 how well it did, that is, NN 550 did well if NN 555 classified the (fake) reconstructed face image 560 as a (real) face image 520 and NN 550 did poorly or insufficiently well if NN 555 classified the (fake) reconstructed face image 560 as fake. Training NNs 550 and 555 together may be interleaved, or carried out in an alternative manner. For example, NN 550 may be trained over a set of 540 images or iterations and then, e.g., after 100 iterations, a reconstructed face images 560 may be provided to NN 555 for classification as described. In other embodiments, a set of modified reconstructed face images 560 previously created by NN 550 may be provided to NN 555 and used for training NN 555, in yet other embodiments, success or failure indications may be provided to NN 550, from NN 555, based on an average or ratio of reconstructed face images 560 classified as fake or real as described.

In some embodiments, NN 535 (also referred to herein as a discriminator) may be adapted or trained to distinguish between anonymized and anonymized images into which information representing a face was added. More specifically, NN 535 may be adapted or trained to determine how different is an anonymized media 510 from a modified anonymized media 540.

Otherwise described, NN 535 may be trained and/or adapted to classify similar but non-identical pairs of 510/540 media objects as "not-different" if the difference between them is marginal, less or below some level and NN 535 may trained and/or adapted to classify less similar pairs of 510/540 media objects as "too different". For example, in some embodiments, differences between 510 and 530 images may be minimized using a loss function which transforms source images 520 and respective modified images 540 to a selected representation (e.g., a feature vector or some function representing the images), measure the distance between the representations of the images, and attempts to minimize the distance.

Output from NN 535 may be provided as input to NN 530 and used in training NN 530 to create a 540 media object such that (a) the identity of the human who's face is shown in image 520 is concealed and (b) modified image 540 highly resembles, or is as similar or close as possible to, anonymized image 510. Otherwise described, provided with a 510 anonymized image and a 540 modified anonymized image, NN 535 may be adapted to determine or identify which of the two input images is the input 510 image and which is the modified 540 image. Output from NN 535 may be provided back to NN 530 thus indicating, to NN 530, how close or similar images 510 and 540 are, and NN 530 may use input from NN 535 in order to improve its performance, that is, in order to create modified images 540 which conceal identities and, at the same time, are as close as possible to respective 510 images.

As illustrated in FIG. 5, modified anonymized media 540 may be provided to reconstructor NN 550 which may be trained to recreate or reconstruct, from modified anonymized media 540 the face in source face image 520 in the form of reconstructed face image 560 (also referred to herein as image 560). In some embodiments, adversarial training may be used to train NN 550. For example, adversary NN 555 may be trained to identify differences between the face in image 560 and the face in image 520. For example and as illustrated in FIG. 5, NN 555 may receive image 520 and image 560 and may be trained to determine whether or not the two images are the same. Accordingly, in a training according some embodiments, NN 550 tries, learns or is trained to, fool NN 555 into thinking image 520 and image 560 are the same while NN 555 tries, learns or is trained to identify differences between image 520 and image 560.

As illustrated, NN 550 may receive input from NN 555, e.g., NN 550 may "know" whether or not it managed to fool NN 555 into thinking that image 560 and image 520 are the same image.

In some embodiments, NN 555 may be adapted, or trained to identify or determine, given two images, which of the two is an original image 520 and which is a reconstructed image 560, and, as shown, output from NN 555 may be provided back to NN 550 thus indicating to NN 550 how close or similar image 560 is to image 520. Accordingly, during training, NN 555 keeps informing NN 550 how well it performs, that is, how close an image 560 is to its respective image 520 thus, during training, NN 550 keeps getting better at generating images 560 which are as close as possible to images 520. In some embodiments, differences between 520 images and respective 560 images may be minimized using a loss function which transforms input images 520 and reconstructed images 560 to a selected representation (e.g., a feature vector or some function representing the images), measure the distance between the representations of the images, and attempts to minimize the distance.

Accordingly, in some embodiments, loop or race as described with reference to NN 530 and NN 535 is created for NN 550 and NN 555 in a training, this loop or race can be kept running until NN 550 creates learns or is trained to adequately reconstruct image 520 from image 560, e.g., such that a third party unit cannot distinguish, or find differences, between image 520 and image 560.

In some embodiments, a method of concealing and revealing a human face in media objects may include: obtaining a first media object capturing an image of the face; employing a first unit to: extract, from the first media object, a set of features representing the face, and generate a second media object, by embedding the extracted features in an anonymized media object, wherein perceptual differences between the second media object and the anonymized media object are minimized by the first unit. The method may further include employing a second unit to recognize the face based on the second media object. For example, recognizing or identifying a face in the second (anonymized) media object may include reconstructing the first (original image) media based on the second (anonymized) media and associating the reconstructed media or image with the first media object (e.g., first original image), e.g., determining that both first and reconstructed media objects include a representation of the same face. In some embodiments, recognizing a face in an anonymized image may not include reconstructing an image as described, rather, an embodiments (e.g., NN 550) may extract data (features) from an anonymized image (e.g., from media 540) and use the extracted data to identify a person or to determine that the face of person whose features are embedded or included in media 540 is same as the face in media 520.

Otherwise described, an embodiment may determine whether or not the face shown or captured in an input, first image (e.g., a face captured by an image 520) and the face represented in a second image (e.g., image 540) are of the same person, thus, recognizing a face in the second image may be, or may include, determining the face in the second image is of the person whose face is captured or depicted in the first image. The terms or phrases "features" and "features representing a face" used herein may relate or refer to any information extracted from an image or derived based on an image. For example, a feature may be the color of eyes, the distance between eyes, a point of view of a camera taking a picture, a color density, an orientation of a face in an image and the like. Generally, where NNs are involved, features may be any aspect, information, parameter or value in an image that an NN learns, or is trained to identify. Accordingly, features may be extracted from an image and/or embedded into an image. For example, embedding a feature into an image may include modifying the color of eyes in an image of a face, changing skin color, changing hair style, changing an orientation of a face in an image and so on.

The method may further include employing the second unit to: extract, from the second media object, at least some of the embedded features, and reconstruct the image of the face based on the extracted features.

For example, acting as the first unit, NN 530 may be trained to conceal a human face by obtaining image 520 (first media object), extract from image 520 a set of features representing a face captured by image 520 and generate or create media 540 (a second media object) by embedding the extracted features in media 510 such that perceptual differences between media 510 and media 540 are minimized. As further described, training an NN may include developing a model that may subsequently be used as part of units in any (possibly large number of) number systems. In some embodiments, reconstructing an image of a face is such that the face is recognizable by a human. For example, NN 550 may be trained such that a human is easily able to determine that the face in media 560 is the same face in media 520. For example, NN 555 may be trained and/or configured to mimic human perception of images and may thus cause NN 550 to produce images 560 with accuracy that would satisfy humans.

In some embodiments, reconstructing an image of a face is such that the face is recognizable by a computerized face recognition unit. For example, the standard set for NN 550 is that a face recognition unit or software is able to determine that the face in image 560 is the same face in image 520. For example, NN 555 may mimic or include face recognition software and may thus cause NN 550 to keep improving until the face recognition software or unit is able to determine that the faces in images 560 and 520 are of the same person.

In some embodiments, embedding extracted features in an anonymized media object includes at least one of: modifying, according to the extracted features, a predefined set of pixels in the anonymized media object; and modifying, according to the extracted features, a set of pixels in the anonymized media object, wherein the set of pixels is selected based on a function of at least one of: a scene, a location, an intensity, a color and a frequency calculated based on a set of pixels.

For example, to create media 540, NN 540 may embed, insert or include pixels (or pixel values) in media 510 such that the inserted or modified pixels represent features, or information extracted from image 520. The specific pixels in media 510 which NN 530 modifies or replaces may be selected based on any combination of logic and pixels' attributes. For example, NN 530 may replace or modify only pixels in a scene (but not in an anonymized face), or NN 530 may replace pixels in specific locations (e.g., pixels in specific offsets from a reference pixel where the offsets are calculated according to some function). In other cases, NN 530 may replace, insert or modify pixels in media 510 according to a frequency of pixel values in media 510, a color and so on. It will be noted that the logic for selecting which pixels to replace may be predefined or it may be autonomously developed by NN 530, e.g., during a training in which NN 530 attempts to fool NN 535 into thinking that medias 510 and 540 are the same media NN 530 may autonomously devise ways of embedding information in media 510 when creating media 540. Of course, training as described may include repeating the process of creating media 540 using many pairs of media 510 and image 520.

In some embodiments, by training an NN as described, a model may be created and such model may subsequently be used by many units, e.g., by a plurality of systems adapted to receive and be configured based on a model. Accordingly, it will be understood that units described herein as concealing and revealing a human face in images may be units that include a model created by training an NN as described.

In some embodiments, some units may include a model which was developed using adversarial training. For example, training of NN 530 using adversarial NN 535 is an adversarial training that develops a model in NN 530. In some embodiments, training NNs, e.g., training NNs 530, 535, 550 and 555, may be done using a training set of pairs, each pair including a media object capturing an image of a face and corresponding anonymized media object, e.g., pairs of media 510 and image 520.

In some embodiments, an anonymized media may be created by replacing a face in an image with an anonymized face. For example, in some embodiments, a pair of image and anonymized media object (e.g., a 520/510 pair) may be created by anonymizing the image to create the anonymized media object. For example, starting with a clear input image in which John is clearly seen (image 520), an embodiment may modify the input image of John such that John can no longer be seen or identified in the modified image and the embodiment may then pair the modified image with the input image, e.g., use the input and modified images as image 520 and media 510 in a training cycle. Training an NN may include any (possibly very large) number of cycles involving a large number of 520/510 image/media pairs.

Although for the sake of clarity and simplicity, a single face in an images and media objects is described, it will be understood that any number of faces may be included or shown in images and medias 510, 520, 540 and 560. In some embodiments, a first media object (e.g., 510) may capture, include or show, a set of faces and, for some, or even all of the faces in the set, an embodiment may: extract, from the first media object (e.g., from 510), a set of features, and embed the extracted features in an anonymized media object, e.g., in media 510 thus creating media 540. Accordingly, any number of faces in an input image may be concealed in a media 540.

In some embodiments, a plurality or set of faces concealed in a media (e.g., in media 540 as described) may be revealed, e.g., made visible, recognizable or identifiable in image 560. For example, NN 550 may be trained to extract, from media 540, embedded features of a plurality of faces and use the extracted features to reconstruct (e.g., in image 560) the set of faces. For example, in an exemplary case of using an embodiment of the invention, image 510 clearly shows a number of family members, the family members cannot be seen or identified in media 540 (which may be safely stored without worrying that unauthorized people are able to see who is in the picture) and image 560 may be an image that, similar to image 520, clearly shows the family members.

In some embodiments, a set of NNs may be trained together, simultaneously, concurrently and/or at the same time. For example, a training session of NN 530 may be viewed as a sequence of steps where, in each step, NN 530 creates a media 540 based on a (possibly different) input image 520 and gets input from NN 535 indicating how well it performed. In order to train NNs 530 and 550 together or simultaneously, the output of NN 530 in each step may be provided as input to the next step of NN 550, thus the system shown in FIG. 5 may be trained as a unit and the training may improve the unit's capability of concealing, anonymizing, obfuscating or obscuring a face in an image as well improve the unit's capability of reconstructing or revealing a face concealed in an anonymized object. Of course, parts of the system shown in FIG. 5 may be used separately, for example, at a first time or stage, NN 530 (or a model developed by training NN 530) may be use, e.g., by an organization in order to conceal or hide faces of employees in images stored in a database of the organization (e.g., as media 540 objects). At some later time or stage, NN 550 (or a model developed by training NN 550) may be used, by the organization, in order to reveal or see the face of a specific employee, e.g., by creating an image 560 from the media 540 of the specific employee.

While certain features of the invention have been illustrated and described herein, many modifications, substitutions, changes, and equivalents may occur to those skilled in the art. It is, therefore, to be understood that the appended claims are intended to cover all such modifications and changes as fall within the invention.

Various embodiments have been presented. Each of these embodiments may, of course, include features from other

The invention claimed is:

1. A method of concealing and revealing a human face in images, the method comprising:
   obtaining a first image of the face;
   employing a first unit to:
   extract, from the first image of the face, a set of features representing the face, and
   generate a second image by inserting pixels in an anonymized image, such that the inserted pixels represent the extracted features wherein perceptual differences between the second image and the anonymized image are minimized by the first unit; and
   employing a second unit to extract at least some of the inserted pixels from the second image and recognize the face based on the extracted inserted pixels.

2. The method of claim 1, comprising: employing the second unit to: generate a reconstructed image by reconstructing the first image of the face based on the extracted features-inserted pixels.

3. The method of claim 2, wherein reconstructing the first image of the face is such that the face is recognizable by a computerized face recognition unit.

4. The method of claim 2, wherein at least one of the first and second units includes a model generated by adversarial training of a neural network using a discriminator adapted to classify an image as: either the first image or the second image, or either the second image or the reconstructed image.

5. The method of claim 1, wherein inserting the inserted pixels in the anonymized image includes at least one of: modifying, according to the extracted features, a predefined set of pixels in the anonymized image; and modifying, according to the extracted features, a set of pixels in the anonymized image, wherein the set of pixels is selected based on a function of at least one of: a scene, a location, an intensity, a color and a frequency calculated based on a set of pixels.

6. The method of claim 1, wherein the first and second units include respective first and second models generated by training respective first and second neural networks.

7. The method of claim 6, wherein the first and second neural networks are trained simultaneously.

8. The method of claim 6, wherein at least one of the first and second neural networks is trained using a training set of pairs of an image of a face and corresponding anonymized image, and wherein in each of the anonymized images, the face from the corresponding image is replaced by an anonymized face.

9. The method of claim 1, wherein the first image captures a set of faces and wherein, for each of at least some of the faces in the set, the method includes:
   extracting, from the first image, a set of features, and
   embedding the extracted features in an anonymized image; and wherein the method further includes:
   extracting from the second image, at least some of the embedded features, and
   reconstructing images of at least some of the faces in the set based on the extracted features.

10. A non-transitory computer readable medium comprising instructions which, when executed by a processor, cause the processor to implement the method of:
    obtaining a first image of the face;
    employing a first unit to:
    extract, from the first image of the face, a set of features representing the face, and
    generate a second image, by inserting pixels in an anonymized image, such that the inserted pixels represent the extracted features wherein perceptual differences between the second image and the anonymized image are minimized by the first unit; and
    employing a second unit to extract at least some of the inserted pixels from the second image recognize the face based on the extracted inserted pixels.

11. A system for concealing and revealing a human face in images, the system comprising:
    a memory; and
    a processor configured to:
    obtain a first image of the face;
    employ a first unit to:
    extract, from the first image of the face, a set of features representing the face, and
    generate a second image, by inserting pixels in an anonymized image, such that the inserted pixels represent the extracted features wherein perceptual differences between the second image and the anonymized image are minimized by the first unit; and
    employ a second unit to extract at least some of the inserted pixels from the second image and recognize the face based on the inserted pixels.

12. The system of claim 11, wherein the processor is configured to employ the second unit to: generate a reconstructed image by reconstructing the first image of the face based on the extracted inserted pixels.

13. The system of claim 12, wherein the processor is configured to reconstruct the first image of the face such that the face is recognizable by a computerized face recognition unit.

14. The system of claim 12, wherein at least one of the first and second units includes a model generated by adversarial training of a neural network using a discriminator adapted to classify an image as: either the first image or the second image, or either the second image or the reconstructed image.

15. The system of claim 11, wherein inserting the inserted pixels in the anonymized image includes at least one of:
    modifying, according to the extracted features, a predefined set of pixels in the anonymized image; and
    modifying, according to the extracted features, a set of pixels in the anonymized image, wherein the set of pixels is selected based on a function of at least one of: a scene, a location, an intensity, a color and a frequency calculated based on a set of pixels.

16. The system of claim 11, wherein the first and second units include respective first and second models generated by training respective first and second neural networks.

17. The system of claim 16, wherein the first and second neural networks are trained simultaneously.

18. The system of claim 16, wherein at least one of the first and second neural networks is trained using a training set of pairs of an image of a face and corresponding anonymized image, and wherein in each of the anonymized images, the face from the corresponding image is replaced by an anonymized face.

19. The system of claim 11, wherein the first image captures a set of faces and wherein, for each of at least some of the faces in the set, the processor is configured to:
    extract, from the first image, a set of features, and embed the extracted features in an anonymized image media;
    extract from the second image, at least some of the embedded features, and reconstruct images of at least some of the faces in the set based on the extracted features.

* * * * *